Patented Aug. 16, 1927.

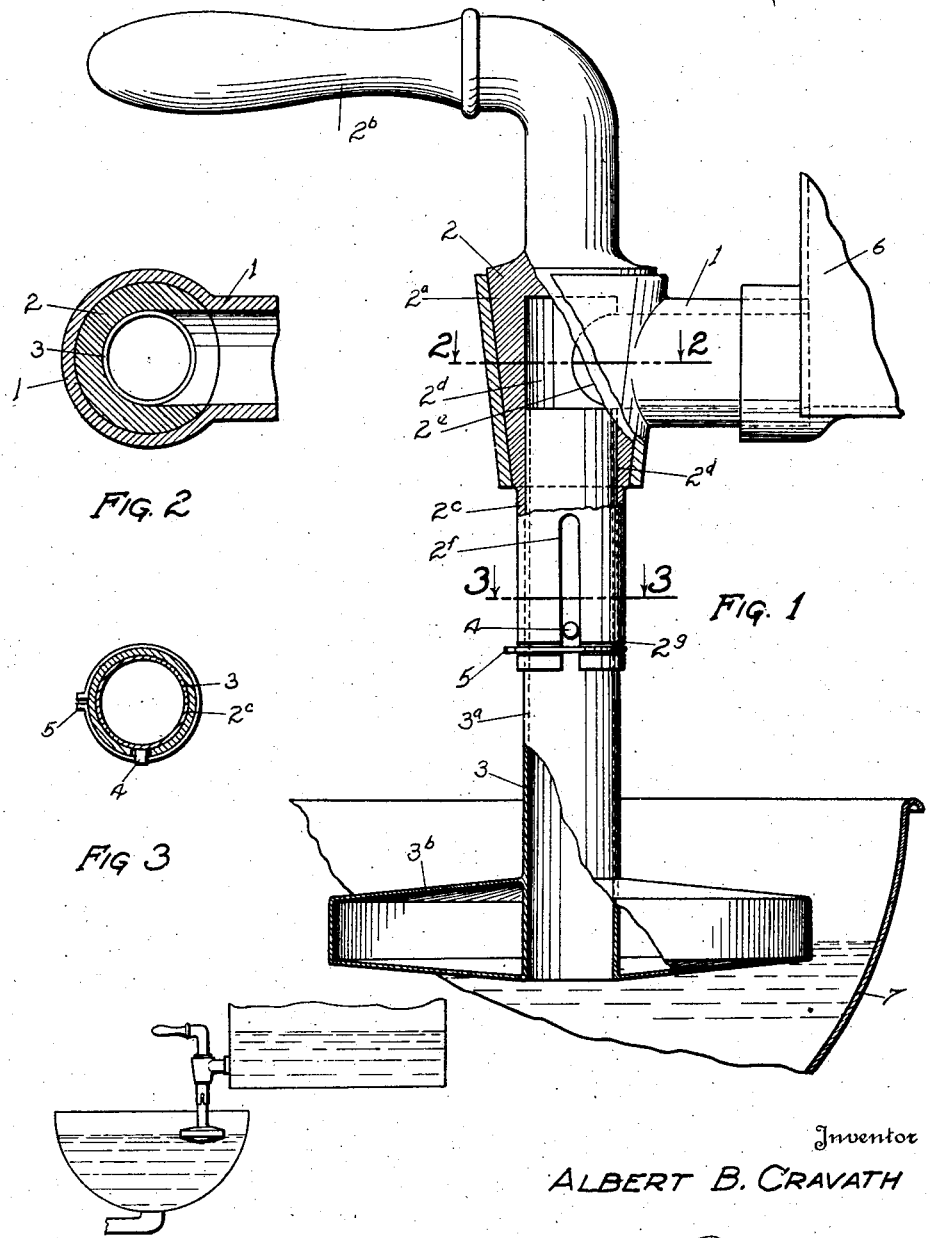

1,639,556

UNITED STATES PATENT OFFICE.

ALBERT B. CRAVATH, OF HOLTVILLE, CALIFORNIA.

FLOAT-CONTROLLED FAUCET.

Application filed June 2, 1925. Serial No. 34,330.

My invention relates to a float controlled faucet, particularly adapted for retaining the level of milk in supply cans of cream separators at substantially fixed levels, and also adapted for other similar uses.

The objects of my invention are: First, to provide a faucet having a float for regulating the discharge of liquid from said faucet depending upon the height of the liquid in the receiving receptacle, which float may be easily and quickly removed from said faucet for discharging liquid directly into said receptacle and for controlling said flow manually; second, to provide a faucet at the discharge end of which is reciprocally mounted a float member through which the liquid from said faucet is discharged and which may be easily removed from said faucet; third, to provide a faucet in the spout of which is movably positioned the hollow stem of a float member, through the hollow stem of which the liquid of the tank to which said faucet is connected may be discharged when the level of the liquid in the receiving receptacle is below a certain level, and whereby the liquid normally flowing through said faucet may be shut off when the level of the liquid in the receiving receptacle is raised beyond a predetermined mark; fourth, to provide as a whole a novelly constructed float controlled faucet, and fifth, to provide a faucet of this class which is very simple and economical of construction, durable, automatic in its action and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my float controlled faucet connected with a supply receptacle, shown fragmentarily and in connection with a partially filled liquid receiving receptacle, shown fragmentarily and in section, certain parts and portions of the faucet members and the float member being broken away and in section to facilitate the illustration; Fig. 2 is a fragmentary transverse sectional view thereof, taken through line 2—2 of Fig. 1; Fig. 3 is a transverse sectional view thereof, taken through line 3—3 of Fig. 1, and Fig. 4 is a side elevational view on a reduced scale of my float controlled faucet in connection with the supply receptacle and receiving receptacle, as used in connection with a cream separator.

Like characters of reference refer to similar parts and portions throughout the several views of the drawings.

My float controlled faucet consists essentially of a faucet member 1, a plug member 2 rotatably mounted in the extended hollow enlarged end thereof, a float member 3, a retaining and guide pin 4, and a retaining ring 5.

The faucet member 1 is adapted to be secured at its one end to the lower portion of a liquid supply receptacle 6 in any suitable manner. The portion of the faucet member 1 connected with the tank 6 is hollow, the hollow portion thereof communicating with the hollow portion at the extended end of said member. The plug member 2 is provided with a hollow plug portion $2^a$ which is tapered downwardly and seats in a correspondingly shaped recess in the extended enlarged portion of the faucet member 1. Said plug member is provided with a handle $2^b$ for rotating the same within the faucet member 1. Said plug member is also provided with a downwardly extending shank $2^c$ below the hollow tapered portion thereof. The plug portion $2^a$ and the downwardly extending shank $2^c$ are provided with a continuous axial bore $2^d$ which communicates near its upper end, through a transverse port $2^e$, with the interior of the faucet member 1, the upper end of the bore $2^d$ extending preferably a slight distance above the upper portion of the transverse port $2^e$, as shown best in Fig. 1. Within the bore $2^d$ of the plug member 2 is reciprocally positioned the upper end of the hollow stem $3^a$ of the float member 3, which float member is provided at its lower end with an annularly shaped float portion $3^b$. Said stem $3^a$ is provided with a pin 4 intermediate its ends, which extends outwardly through a slot $2^f$ in the shank portion of the plug member 2 for guiding said float. Near the lower end of the shank $2^c$ of the plug member 2 is provided an annular groove $2^g$ in which is removably positioned a retaining ring 5 for retaining the stem 3ª of the float member 3 within the shank or spout portion of the plug member.

Thus it will be seen that when the liquid in the receiving receptacle 7, in which the liquid is adapted to be retained at a certain level, falls below said predetermined level, the float member 3 will drop until the pin 4 engages the retaining ring 5, in which case the upper end of the hollow stem 3ª is positioned below the lower portion of the transverse port 2ᵉ in the plug member 2, permitting the liquid in the tank or receptacle 6 to flow through the hollow stem 3ª into the receptacle 7, providing the handle 2ᵇ is as shown or the transverse port 2ᵉ of the plug member 2 registers with the passage in the member 1. As the level of the liquid in the receptacle 7 is raised, the float member 3 is correspondingly raised, gradually shutting off the liquid from the receptacle 6 until the upper end of the hollow stem 3ª is shifted upwardly to its limit when the liquid from the receptacle 6 is substantially completely shut off. It will be here noted that the liquid from the receptacle 6 may be shut off at any time or partially shut off by rotating the plug member 2. The float member 3 may be readily removed from the plug member 2 by removing the retaining ring 5 and withdrawing the stem of the float member, thus providing a faucet of substantially ordinary construction.

Though I have shown and described a particular construction, combination and arrangement of parts and portions, I do not wish to be limited to this particular construction, combination and arrangement, but desire to include in the scope of my invention of the construction, combination and arrangement substantially as set forth in the appended claims.

Having thus described my invention, what I claim as new and desire to secure by Letters Patent is:

1. In a means of the class described, a hollow faucet member having a tapered portion at one end, a hollow tapered plug member rotatably mounted in said tapered portion and provided with a port adapted to register with the passage in said hollow faucet member and having a right angled extending handle on its normally upper end and with a tubular extended portion on its normally lower end, and a float member provided with a tubular portion extending therethrough, said tubular portion being reciprocally mounted in said tubular extended portion and said plug member for controlling the flow of liquid therefrom.

2. In a means of the class described, a hollow faucet member having a tapered portion at one end, a hollow tapered plug member rotatably mounted in said tapered portion and provided with a port adapted to register with the passage in said hollow faucet member and having a right angled extending handle on its normally upper end and with a tubular extended portion on its normally lower end, a float member provided with a tubular portion extending therethrough, said tubular portion being reciprocally mounted in said tubular extended portion and said plug member for controlling the flow of liquid therefrom, and means for readily removably connecting said tubular portion with said tubular extended portion.

3. In a means of the class described, a hollow faucet member having a tapered portion at one end, a hollow tapered plug member rotatably mounted within said tapered portion and provided with a port adapted to register with the passage in said hollow faucet member and having an integral extended tubular portion, and a float member provided with a liquid conducting tube shiftably mounted within said plug member and said extended tubular portion adapted to register with the inlet port in the plug member and also to cover said port.

4. In a means of the class described, a hollow faucet member having a tapered portion at one end, a hollow tapered plug member rotatably mounted within said tapered portion and provided with a port adapted to register with the passage in said hollow faucet member and having an integral extended tubular portion, and a float member provided with a tubular portion extending therethrough, said tubular portion of the float member being reciprocally mounted in said extended tubular portion and said plug member for controlling the flow of liquid therefrom.

In testimony whereof, I have hereunto set my hand at Holtville, California, this 25 day of May, 1925.

ALBERT B. CRAVATH.